United States Patent
Curran et al.

[15] 3,660,090
[45] May 2, 1972

[54] TECHNIQUE FOR INCREASING THE SPEED OF DICHROMATED GELATIN

[72] Inventors: Robert Kryan Curran, Stirling; Lillian Ann Rankel, North Plainfield, both of N.J.

[73] Assignee: Bell Telephone Laboratories, Incorporated, Murray Hill, N.J.

[22] Filed: Mar. 30, 1970

[21] Appl. No.: 23,575

[52] U.S. Cl. .....................................96/49, 96/27 H, 96/93, 350/3.5
[51] Int. Cl. ........................................G03c 5/22, G03c 5/04
[58] Field of Search ......................96/27 H, 49, 93, 75, 45.2; 350/3.5

[56] References Cited

UNITED STATES PATENTS

| | | | |
|---|---|---|---|
| 2,675,315 | 4/1954 | Staehle et al. | 96/93 X |
| 2,716,060 | 8/1955 | Lupo | 96/93 |
| 2,652,345 | 9/1953 | Jones | 96/114 |
| 1,609,091 | 11/1926 | Miller | 96/93 X |
| 3,012,886 | 12/1961 | Lerner | 96/93 X |
| 2,484,431 | 10/1949 | Staehle et al. | 96/93 X |
| 3,567,444 | 3/1971 | Shankoff | 96/27 H |

OTHER PUBLICATIONS

Shankoff; T. A., "Applied Optics," Vol. 7 No. 10, Oct. 1968, pp. 2101- 2105.
Brandes; R. G. et al., "Applied Optics," Vol. 8 No. 11, Nov. 1969, pp. 2346- 2348.
Lin; L. H., "Applied Optics," Vol. 8, No. 5, May 1969, pp. 963- 966.
Shankoff; T. A. et al., Opt. Soc. Am. J., Vol. 59 n. 11, Nov. 1969, p. 1529.
Kosar; J., "Light-Sensitive Systems," Wiley & Sons, 1965, pp. 46- 48, 52- 62, 67, 68, 78- 80, 82- 90.
Anon. "PMI," Vol. 12, Mar. 1969, pp. 58- 63.

*Primary Examiner*—Charles L. Bowers, Jr.
*Attorney*—R. J. Guenther and Edwin B. Cave

[57] ABSTRACT

A technique for increasing the photographic speed of dichromated gelatin destined for use in holographic system involves subjecting the gelatin to an ammonia-water vapor ambient subsequent to exposure and prior to development.

6 Claims, 2 Drawing Figures

EXPOSURE CURVE AT 4880 Å, T=30°

EXPOSURE CURVE AT 5145 Å, T=30°

EXPOSURE CURVE AT 4880 Å, T=30°

EXPOSURE CURVE AT 5145 Å, T=30°

INVENTORS R. K. CURRAN
L. A. RANKEL
BY
ATTORNEY

TECHNIQUE FOR INCREASING THE SPEED OF DICHROMATED GELATIN

BACKGROUND OF THE INVENTION

1. Field of the Invention

This invention relates to a technique for increasing the photographic speed of dichromated gelatin. More particularly, the present invention relates to a technique for increasing the photographic speed of a dichromated gelatin hologram recording medium.

2. Description of the Prior Art

One of the many consequences of the discovery of the laser has been the emergence of holography as a practical method for storing and retrieving optical information. The fundamentals of holography are now well known and have been described by Leith et al. in Scientific American, Vol. 212, No. 6, pages 34–35, June 1965, and by Stroke, Introduction to Coherent Optics and Holography, Academic Press, 1966. A considerable degree of attention has been focused upon the mechanics of recording and displaying optical images and much effort has been devoted to the type of media selected for use in holographic applications. Such media typically comprise an aqueous gelatin system that is sensitized with a sensitizer such as pyridine-dichromate and pyridine-chromium trioxide. The use of dichromated gelatin for such purposes is based upon the photochemically induced differential solubility and swelling of exposed and unexposed gelatin. This differential swelling is attributed to cross-linking of gelatin by the photolytic decomposition products of the dichromate sensitizer which insolubilizes gelatin to a degree determined by total exposure. The resultant image is developed, in part, by removal of gelatin not previously cross-linked, by the shrinkage and subsequent formation of an air-gelatin interface by splitting or cracking of the gelatin.

Although the dichromated gelatin has proven to be satisfactory in most holographic applications, workers in the art have long sought to increase the photographic sensitivity of the system in the spectral region of 4,800 to 5,300 angstroms, the range within which available lasers proposed for use in optical memory devices are operative

SUMMARY OF THE INVENTION

In accordance with the present invention, a technique is described for enhancing the photographic speed of dichromated gelatin by increasing the differential solubility and the swelling rate of the exposed and unexposed gelatin. This end is attained by a process which involves subjecting a previously exposed dichromated gelatin recording medium to an ammonia-water vapor ambient prior to development.

BRIEF DESCRIPTION OF THE DRAWING

The invention will be more readily understood by reference to the following detailed description taken in conjunction with the accompanying drawing, wherein.

DETAILED DESCRIPTION

Figure 1:
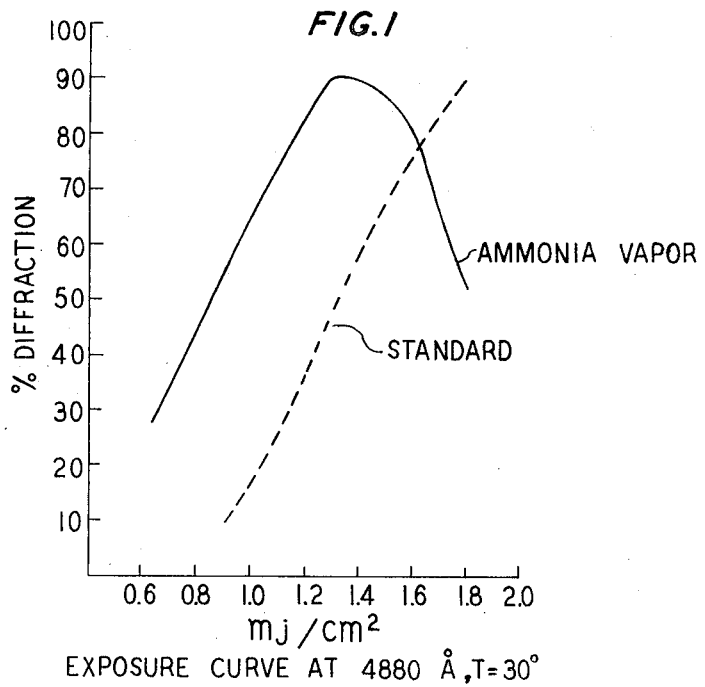
FIG. 1 is a graphical representation on coordinates of photographic speed in millijoules per square centimeter against percent diffraction for dichromated gelatin exposed at 4,880 A. and subsequently subjected to an ammonia-water vapor ambient at 30° C.

In the preparation of a recording medium pursuant to the practice of the present invention, an aqueous dichromate-gelatin solution is placed in film form upon an appropriate substrate, typically glass. The amount of water in the solution is dependent upon the desired film thickness. The films may be prepared by a dip-coating technique wherein the weight ratio of gelatin to water for films less than two microns ranges from 0.02 to 0.08 at 0.17 in. per second dip rate. Other film-forming techniques can be used too with modified weight ratios if desirable and gelatin in amounts up to its solubility limit in water is acceptable.

Following coating, the substrate member is exposed by means of a suitable laser beam. It is known that, in order for a laser beam to record in any holographic medium, there must be sufficient absorption of the light to effect the basic change that indicates whether the light did or did not impinge upon a particular location. The approximate absorptivity of the dichromated gelatin films discussed herein is at wavelengths less than 5,300 A. Experiments reported herein were carried out with an argon laser whose output was at 4,880 A. and an argon laser whose output was at 5,145 A.

After exposure, the dichromated gelatin film has become water insolubilized at those locations where sufficient exposure has occurred. Thereafter, the film is exposed to an ammonia-water vapor ambient for the purpose of enhancing differential solubility and swelling of exposed and unexposed gelatin. The ammonia vapor employed herein may be obtained from an aqueous ammonium hydroxide solution in which the pH is maintained between 8 and 11. Exposure is permitted to this ambient over a temperature range of 25° to 40° C for a time period ranging from 5 to 25 minutes. Studies have revealed that exceeding the noted maxima with respect to the identified parameters results in a decrease in the signal to noise ratio and diffractive power of the recording medium. The noted lower limits are dictated by practical considerations in that no significant increase in film speed is observed until such minima are attained.

Following exposure to the ammonia-water vapor ambient, development is effected. It is preferable that development proceed without delay after the ammonia-water vapor treatment in order to minimize the effect of the dark reaction which is manifested by dichromated gelatin films.

The development process involves washing out the still soluble portions of the gelatin film in warm water, thus leaving behind a pattern formed from the insolubilized residuum of gelatin bonded water, sensitizer and its reaction end products. Since the development technique is capable of recording spacing of 2,600 A and less, swelling or shrinking of the gelatin pattern or development must be minimized. Accordingly, high water temperature and long development times are to be avoided, development typically being carried out at less than 40° C for 2 minutes or less. Cold water has the disadvantage of requiring longer development times since the gelatin is less soluble in it. Optimum conditions of development are about 35°–40 C water temperature for 1 minute.

After removal from the water solution, the gelatin pattern which remains is wet and it is essential that excess moisture be removed quickly and preferably before the film can substantially dry out. Failure to do so prevents fixing of the pattern which results from development. This end may be conveniently attained by washing the film in a water absorbing solvent that is innocuous to the gelatin pattern and is sufficiently volatile to be self-removing. Suitable solvents meeting this requirement are ethanol and propanol. After development is complete, a suitable photometer may be used to measure zero and first order diffraction from the gratings.

Several examples of the present invention are described in detail below. These examples are included merely to aid in the understanding of the invention and variations may be made by one skilled in the art without departing from the spirit and scope of the invention.

EXAMPLE I

This example describes the preparation of a dichromated gelatin holograph recording medium. The substrate chosen for use herein was a 5 × 5 × 0.058 in. glass plate having an index of refraction of 1.523. The recording medium was comprised of 16 percent by weight aqueous gelatin suspension (USP grade gelatin of 125 bloom strength) obtained by adding gelatin to water at 20° C with stirring until a uniform dispersion was obtained and then heating in a water bath maintained at 70° C and stirring until a uniform dispersion was obtained. Thereafter, the gelatin suspension was heated in a water bath maintained at 70° C and stirring continued until suspension was complete. Following, the suspension was filtered at 50° C through a Whatman No. 31 filter paper. Next, the suspension was cooled and then thermostated at 40° C and $(NH_4)_2Cr_2O_7$ added thereto in an amount sufficient to yield a ratio of 0.5 percent with respect to the weight of gelatin.

Then, the glass substrate was dip-coated from the thermostated suspension by conventional dip-coating techniques. Next, the plates were dried for 1 hour and partially hardened by baking in a thermostated oven at 150° C for 2 hours.

The plate was then sensitized by dipping it vertically into a 4 percent aqueous $(NH_4)_2Cr_2O_7$ solution at about 25° C containing one in 20,000 parts of a conventional wetting agent, dipping being continued for 2 minutes. Drying was effected vertically in the dark.

Next, the sensitized substrate was exposed by means of the interference pattern formed by two 4,880 A. argon laser beams subtending a 60° angle simultaneously incident on the substrate. The normal to the substrate bisected the 60° angle between the laser beams and the interference pattern consisted of parallel bright lines separated by dark lines. The intensity of the beams and the time of exposure were adjusted to give a total exposure energy between 0.5 millijoules/cm$^2$ and 6 millijoules/cm$^2$. Following exposure, the substrate member was heated to 30° C and placed in an ammonia-water vapor ambient for 10 minutes, the ammonia having been obtained from an aqueous solution of ammonium hydroxide in a closed system in which the basic ammonium hydroxide solution was maintained at a pH of 10.0.

Development of the resultant substrate was then effected by dipping in water containing one in 20,000 parts of a wetting agent at 45° C for 1 minute followed by insertion for 30 seconds in boiling isopropanol. Drying was accomplished by means of a stream of dry air maintained under pressure. When used as diffraction gratings, the developed gratings produced only the zero and first orders of diffraction. An International Light No. 600 Photometer was then used to measure zero and first order diffraction from the resultant gratings.

For comparative purposes, the procedure described above was repeated with the exception that the exposed substrate was not subjected to the ammonia-water vapor ambient. The results were plotted on coordinates of film speed in millijoules per square centimeter against percent diffraction, the resultant plot being shown in FIG. 1. Analysis of the Figure clearly reveals that the inventive technique results in a significant increase in the photographic speed of dichromated gelatin as compared with prior art films. More specifically, it will be noted that at 30 percent diffraction the speed of the dichromated gelatin is approximately 0.65 millijoules per square centimeter compared with a film speed of approximately 1.2 millijoules per square centimeter for the prior art films at a similar percentage of diffraction, such prior art film not having been given the inventive treatment of exposure to an ammonia-water vapor ambient. Further analysis of the curves indicates that this behavior continues up to at least 90 percent diffraction.

EXAMPLE II

Figure 2:
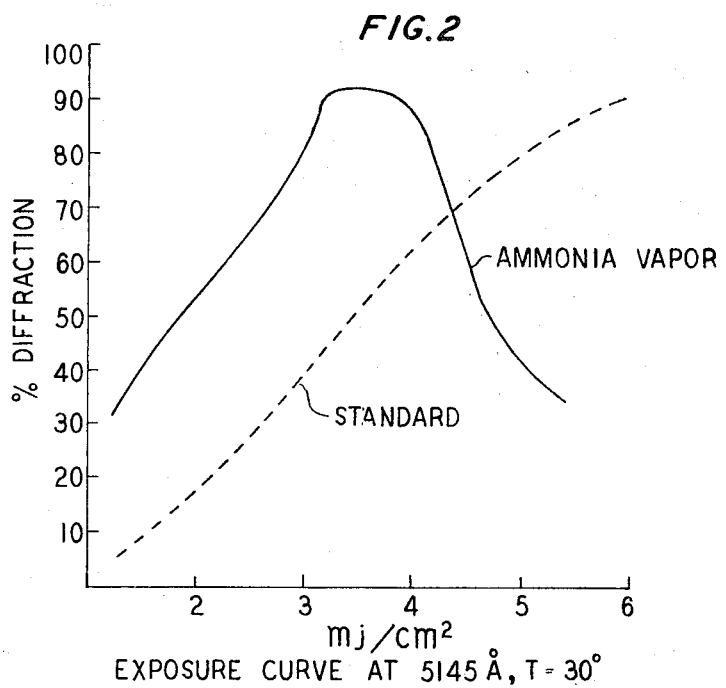
FIG. 2 is a graphical representation on coordinates of photographic speed in millijoules per square centimeter against percent diffraction for dichromated gelatin exposed at 5,145 A. and subsequently subjected to an ammonia-water vapor ambient at 30° C.

The procedure of Example I was repeated with the exception that the exposure was effected with an argon laser whose output was at 5,145 A. The results obtained and a comparison thereof with prior art films not given the inventive treatment is shown in FIG. 2. Once again, the graphical representation reveals the described technique results in a marked increase in the photographic speed of the dichromated gelatin.

We claim:
1. In a technique for increasing photographic speed in the spectral region of 4,800 to 5,300 A of a sensitized substrate comprising the steps of exposing said sensitized substrate which has a dichromated gelatin coating thereon comprising gelatin and dichromate compound by means of an interference pattern formed by coherent light beams having a wavelength of light within the range of 4800 A. to 5,300 A., thereby insolubilizing the said coating in the exposed areas; developing by contacting the exposed coating with water to dissolve away the still-soluble portions; then contacting said coating with a water absorbable volatile solvent and drying said coating by allowing the solvent and water to evaporate; the improvement which comprises subjecting said coating to an ammonia-water vapor ambient at a temperature ranging from 25° to 40° C for a time period within the range of 5 to 25 minutes subsequent to exposure and prior to development, said ammonia being obtained from an aqueous ammonia hydroxide solution in which the ammonium hydroxide was maintained at a pH within the range of 8 to 11.

2. A technique in accordance with claim 1 wherein said film is sensitized with $(NH_4)_2Cr_2O_7$.

3. A technique in accordance with claim 1 wherein exposure is effected with an argon laser whose output is 4,880 A.

4. A technique in accordance with claim 1 wherein an exposure is effected with an argon laser whose output is at 5,145 A.

5. A technique in accordance with claim 1 wherein the pH of said ammonium hydroxide solution is 10.

6. A technique in accordance with claim 5 wherein exposure to said ammonia-water vapor ambient is for ten minutes, the said substrate being heated to a temperature of 30° C.

* * * * *